(12) United States Patent
Brockman et al.

(10) Patent No.: US 10,489,037 B2
(45) Date of Patent: Nov. 26, 2019

(54) SYSTEM AND METHOD FOR SELECTING WINDOW TINT

(71) Applicant: THE REYNOLDS AND REYNOLDS COMPANY, Kettering, OH (US)

(72) Inventors: Robert T. Brockman, Houston, TX (US); Sidney Haider, Houston, TX (US)

(73) Assignee: THE REYNOLDS AND REYNOLDS COMPANY, Kettering, OH (US)

( * ) Notice: Subject to any disclaimer, the term of this patent is extended or adjusted under 35 U.S.C. 154(b) by 875 days.

(21) Appl. No.: 15/014,898

(22) Filed: Feb. 3, 2016

(65) Prior Publication Data

US 2016/0224231 A1    Aug. 4, 2016

Related U.S. Application Data

(60) Provisional application No. 62/111,941, filed on Feb. 4, 2015.

(51) Int. Cl.
*G06F 3/048* (2013.01)
*G06F 3/0484* (2013.01)
*G06F 3/01* (2006.01)

(52) U.S. Cl.
CPC ...... *G06F 3/04847* (2013.01); *G06F 3/04842* (2013.01)

(58) Field of Classification Search
CPC . G06F 3/0482; G06F 3/04842; G06F 3/04847
See application file for complete search history.

(56) References Cited

U.S. PATENT DOCUMENTS

| | | | | |
|---|---|---|---|---|
| 5,873,975 | A * | 2/1999 | Benoit | B29C 63/0004 156/234 |
| 6,389,375 | B1 * | 5/2002 | Thomsen | G06T 17/10 345/420 |
| 7,353,192 | B1 * | 4/2008 | Ellis | G06Q 20/3829 705/26.5 |
| 9,412,203 | B1 * | 8/2016 | Garcia, IIII | G06T 19/006 |
| 2004/0010398 | A1 * | 1/2004 | Noma | G06F 17/5095 703/1 |
| 2007/0156540 | A1 * | 7/2007 | Koren | G06Q 10/087 705/14.51 |
| 2007/0298866 | A1 * | 12/2007 | Gaudiano | A63F 13/00 463/23 |
| 2013/0318479 | A1 * | 11/2013 | Porwal | G06F 3/011 715/849 |
| 2015/0032328 | A1 * | 1/2015 | Healey | B60Q 1/503 701/36 |
| 2018/0033210 | A1 * | 2/2018 | Vats | G06F 3/0487 |

OTHER PUBLICATIONS

Audio Heaven Online Tint Simulator published by "jatry12345" on Apr. 19, 2014 (https://www.youtube.com/watch?v=XXTk0DD-TB0).*

* cited by examiner

*Primary Examiner* — Nicholas Augustine
(74) *Attorney, Agent, or Firm* — Adolph Locklar

(57) ABSTRACT

A method and system for configuring window tint for a vehicle may include a GUI or series of GUIs. The GUI may allow a user to select desired tint criteria. The GUI may allow the user to select the vehicle make, model, trim, and color. The GUI may allow the user to select the windows to be tinted. The GUI may allow the user to select the film type, such as the manufacturer and model type of the tint film. The GUI may allow the user to select the opacity of the tinted windows. The GUI may allow the user to submit an order for tint based on the selected tint criteria.

13 Claims, 5 Drawing Sheets

SYSTEM AND METHOD FOR SELECTING WINDOW TINT

CROSS-REFERENCE TO RELATED APPLICATIONS

The present application claims priority from U.S. Provisional Patent Application No. 62/111,941 filed on Feb. 4, 2015, the entirety of which are incorporated herein by reference.

TECHNICAL FIELD/FIELD OF THE DISCLOSURE

The present disclosure relates generally to computerized method for selecting window tint for vehicles.

BACKGROUND OF THE DISCLOSURE

Window tint for vehicles is often sold by small retail shops and auto dealers. Typically, selling the tint involves showing the films to the customer to have them select the type of window film, level of opacity and selection of windows to be tinted. Selling window tint online may be difficult as customers may not be able to visualize their vehicles with the right type of film.

Tint film manufacturers offer different types of window film and each type of film has its own opacity levels offered. Retailers often want the ability to customize their offering by selecting film types and opacities they would like to offer. Another reason for this customization of offering is state laws limiting the auto glass to be tinted, opacity of film installed etc.

SUMMARY

The present disclosure provides for a method. The method may include generating a graphical user interface (GUI). The GUI may be adapted to allow a user to: (a) select a vehicle comprising windows to be tinted; (b) select the windows to be tinted; (c) select the film type for the windows to be tinted; and (d) select the opacity of the windows to be tinted. The method may further include receiving tint criteria from the GUI corresponding to the selections in (a)-(d). The method may further include generating an order for window tint having the selected tint criteria.

The present disclosure also provides for a system for configuring window tint elements for a vehicle having windows to be tinted. The system may include a non-transitory, tangible computer-readable memory medium. The non-transitory, tangible computer-readable memory medium may include computer program instructions adapted to cause a computing device to display a GUI. The GUI may be adapted to allow the selection of tint criteria. The tint criteria may include the vehicle make, model, and trim; the windows to be tinted; the film type for the windows to be tinted; and the opacity of the windows to be tinted. The computer program instructions may also be adapted to cause the computing device to generate an order for one or more window tint elements corresponding to the selected tint criteria.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
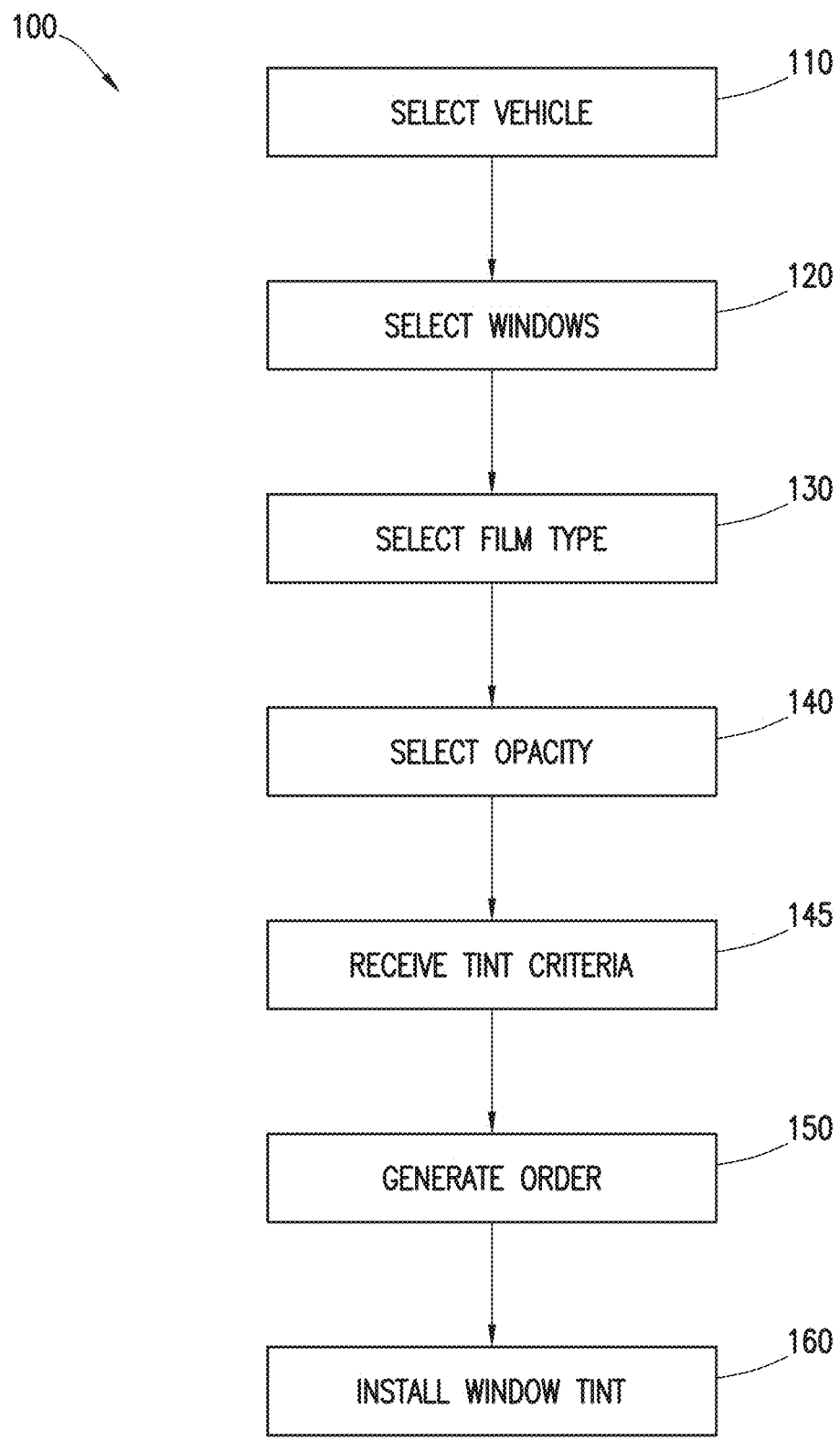
FIG. 1 is a flow chart consistent with a window tint selection process consistent at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein, a "GUI" is a graphical user interface in which data may be displayed and entered. As understood in the art, a GUI may be generated by a device such as a computing device having a non-transitory, tangible computer-readable memory medium having computer code instructions thereon to cause the computing device to generate the GUI. One having ordinary skill in the art with the benefit of this disclosure will understand that a GUI may be displayed by any suitable display device, and may be displayed by a device other than the device used to generate the GUI. As used herein, "selection" refers to an interaction between a user and a GUI through any device including, for instance, without limitation, a mouse, keyboard, controller, or touchscreen. One having ordinary skill in the art with the benefit of this disclosure will understand that the GUI may include one or more elements configured to allow the display, organization, or entry of data or to allow user interaction with the data. The GUI may include, for instance, without limitation, windows, menus, icons, tabs, text boxes or controls such as buttons, check boxes, sliders, list boxes, drop down lists, or links. In certain non-limiting embodiments, the GUIs described below may be customized depending on the device on which they are displayed. For instance, each of the GUIs as discussed below may display different information when displayed on a computer terminal screen than when displayed on a tablet or smartphone screen. Furthermore, any depicted GUI layout or element is included only as an example, and is not intended to limit the scope of this disclosure in any way.

In certain embodiments of the present disclosure, the process of selecting window tint is depicted in FIG. 1. Window tint selection process 100 may include selecting window tint criteria corresponding to a desired window tint configuration. The selection of window tint criteria may include, for instance, without limitation, selecting the make and model of the vehicle to have tint installed (select vehicle 110), selecting the windows to be tinted (select windows 120), selecting the film manufacturer and type (select film type 130), and select film opacity (select opacity 140). As understood in the art, one or more of the window tint criteria may be determined or automatically selected based on any previously selected window tint criteria.

Window tint selection process 100 may include selecting vehicle 110. Selecting vehicle 110 may include, for instance, without limitation, selecting the vehicle make, model, color and trim. Selecting vehicle 110 may be accomplished, for instance, through a GUI or by completion of a form.

Figure 3:
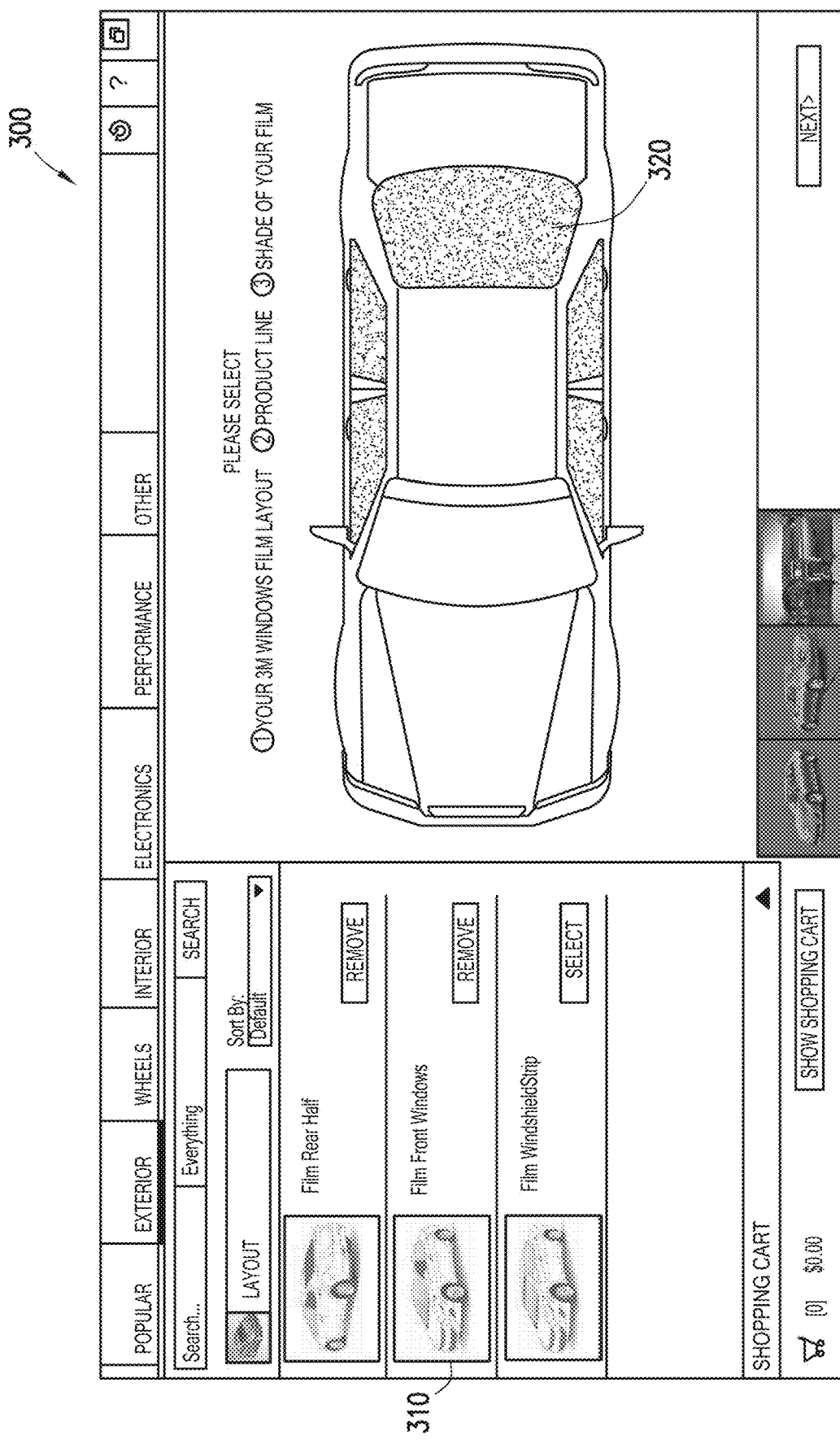
FIG. 3 is picture of a Graphical User Interface (GUI) for selection of the desired windows for tinting consistent with at least one embodiment of the present disclosure.

Window tint selection process may also include select windows 120. Select windows 120 may include selecting which of the windows of the vehicle are to be tinted. In certain embodiments of the present disclosure, the selection of the windows to be tinted may be accomplished through window selection GUI 300, as shown in FIG. 3. Window selection GUI 300 may include, for instance, tinted window selection elements 310. Tinted window selection elements 310 may be selected to select which windows or combination of windows are to be tinted. As shown in FIG. 3, non-limiting examples of combinations of windows to be tinted include film rear half, film front windows and film windshield strip. One having ordinary skill in the art with the benefit of this disclosure will understand that any window tint element or any combination of window tint elements available to be installed on the vehicle may be included in tinted window selection elements 310.

Window selection GUI 300 may further include depict film layout 320, which depicts which of the tinted window selection elements 310 have been selected. Depict film layout 320 may, in some embodiments, depict a representation of the selected vehicle. In some embodiments, depict film layout 320 may display a representation of a generic or otherwise similar vehicle of the same or similar configuration as the selected vehicle. For instance, without limitation, depict film layout 320 may display a representation of a sedan, coupe, roadster, SUV, minivan, or station wagon having similar or the same window configuration as the vehicle selected in selecting vehicle 110. In such an embodiment, the selected window selection elements 310 may be indicated by window selection GUI 300 by, for instance, without limitation, highlighting the selected window selection elements 310 in a different color or by displaying the selected window selection elements 310 on the representation of the vehicle. In addition, in certain embodiments of the present disclosure, window selection GUI 300 may include vehicle depiction 330, which may provide a picture of the vehicle selected in selecting vehicle 110.

Figure 4:
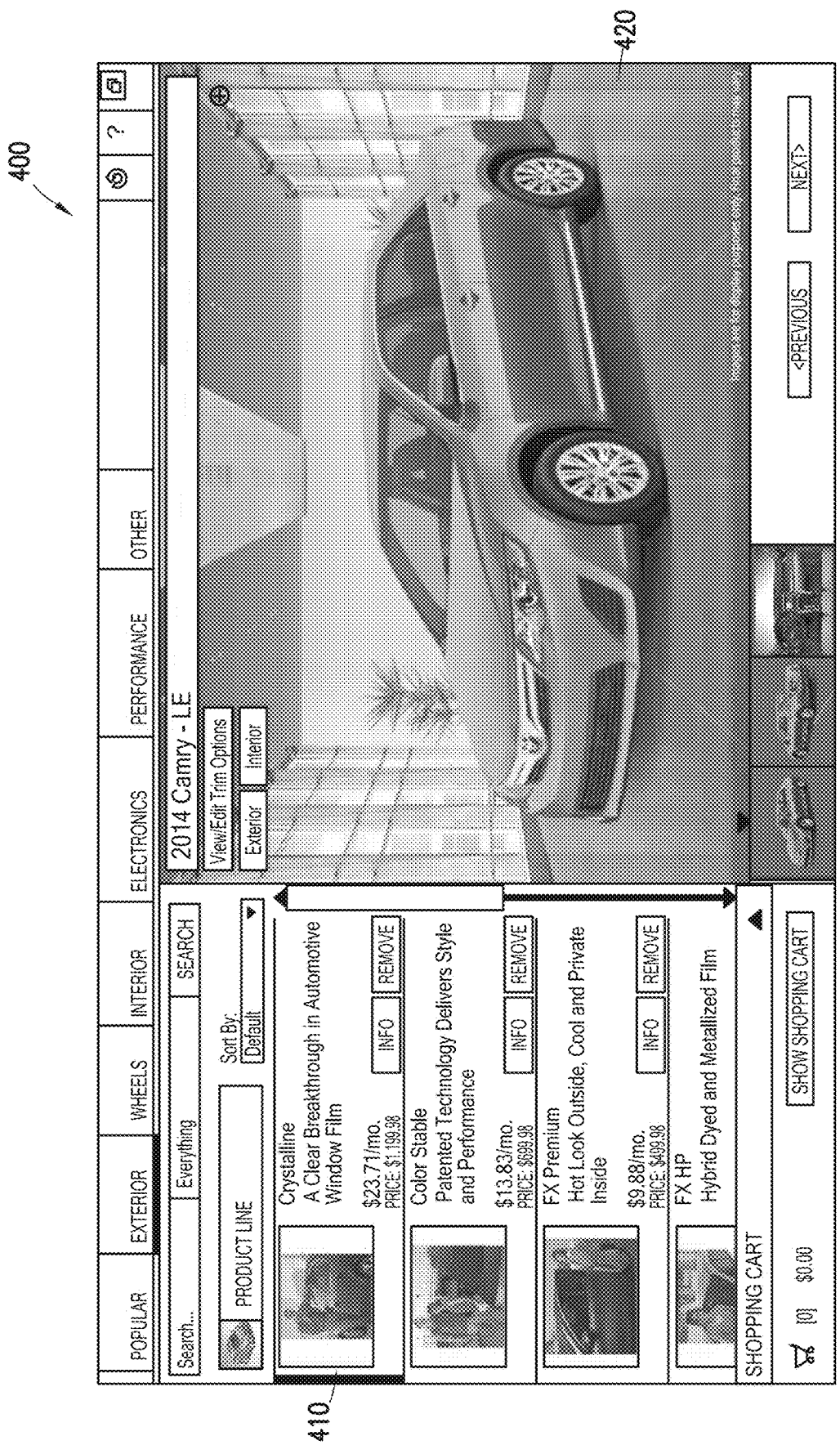
FIG. 4 is a picture of a GUI for selection of the desired product line for the window tinting consistent with at least one embodiment of the present disclosure.

In some embodiments, window tint selection process 100 may include select film type 130. In select film type 130, the manufacturer and model of the desired film type may be selected. In certain embodiments of the present disclosure, select film type 130 may be performed by, for instance, film type GUI 400, as depicted in FIG. 4. Film type GUI 400 may include, for instance, product line selection 410, which allows a selection of both the manufacturer and the product line of the manufacturer desired. Film type GUI 400 further includes vehicle depiction window 420 wherein the vehicle previously selected is depicted. In certain embodiments, GUI 400 may be customizable, for instance by retailers or other users, allowing the retailers or other users to select the products offered or animated on GUI 400. In some embodiments, the retailer may supply information which is received and used to modify GUI 400. This information may include, but is not limited to, windows to be tinted, type of film offered, opacity on the type of films offered, and/or price tint by vehicle type, model type and film type or combinations thereof.

In some embodiments, window tint selection process 100 may include select opacity 140. In select opacity 140, the opacity of the tint may be selected.

Figure 5:
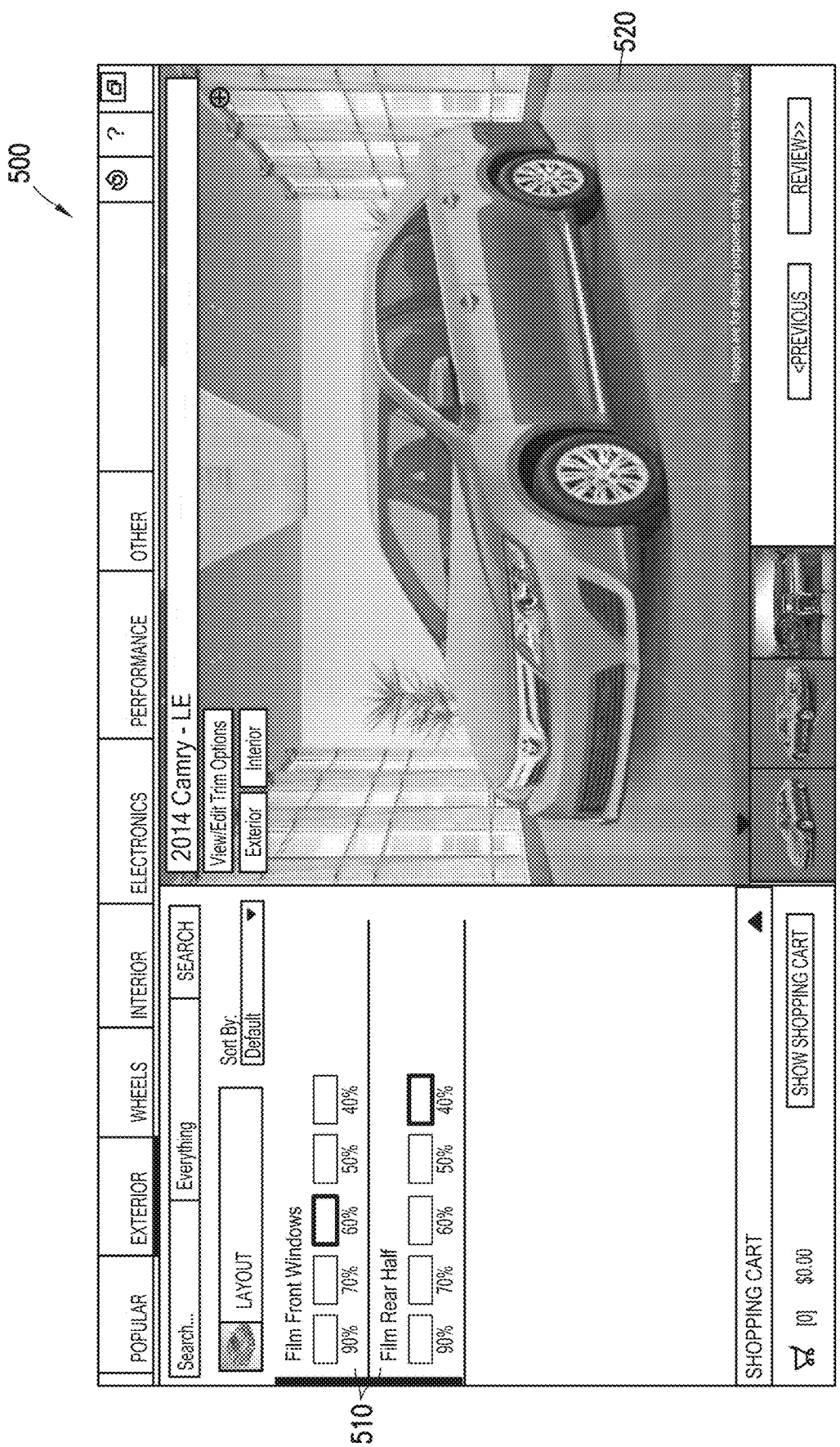
FIG. 5 is a picture of a GUI for selection of the desired degree of opacity for each window to be tinted consistent with at least one embodiment of the present disclosure.

In certain embodiments of the present disclosure, the process step of select opacity may be performed by, for instance opacity selection GUI 500 as shown in FIG. 5. Opacity selection GUI 500 includes, for example opacity selection criteria 510. Opacity selection criteria 510 allows selection of film opacity for the previously selected windows to be tinted. Opacity selection criteria may be limited in opacity depending, for example, by legal requirements often by the state or by the opacity of tint offered by the manufacturer.

In some embodiments, once at least one selection of window tint criteria is made in any of select windows 120, select film type 130, or select opacity 140, a representation of the vehicle selected in select vehicle 110 may be generated to allow the tint configuration to be visualized in real time. For example and without limitation, in some embodiments, such a representation of the vehicle selected in select vehicle 110 having the selected tint configuration may be displayed visualization window 520 as a part of opacity selection GUI 500. As opacity selection criteria 510 is selected or varied, the opacity of the tint displayed on the vehicle in vehicle tint visualization window 520 may be varied accordingly. In vehicle tint visualization window 520, a real time depiction of the vehicle selected with the windows and the respective opacity may be displayed. In some embodiments, vehicle tint visualization window 520 may include a photograph or rendering of the vehicle selected in select vehicle 110 wherein the depiction of the windows may be varied to correspond with the selected tint configuration. In some embodiments, one or more different views may be generated, including, for example, without limitation, a side view, ¾ view, rear view, or interior view. One having ordinary skill in the art with the benefit of this disclosure will understand that although discussed in terms of opacity selection GUI 500 and opacity selection criteria 510, the real time representation may be displayed in any GUI and react in response to any change in tint configuration.

In certain embodiments of the present disclosure, the visual characteristics of the displayed tint elements in vehicle tint visualization window 520 may be determined by, for example, without limitation, hexcode, color shade, and opacity factor. In these embodiments, hexcode may determine the color of the tint element to display in vehicle tint visualization window 520. Color shade may determine the shade percentage of the tint elements to display in vehicle tint visualization window 520. Opacity factor may determine the darkness, hardness, or opacity of the tint elements to display in vehicle tint visualization window 520. By applying these three elements, the depiction of the vehicle selected in select vehicle 110 may, for example and without limitation, more closely approximate the look and feel of each tint element product and opacity.

In some embodiments, window tint selection process may also include receive window tint criteria 145. In select window tint criteria 145, information collected through one or more of window selection GUI 300, film type GUI 400, and opacity selection GUI 500 may be communicated to and received by an order generator. In some embodiments, window tint selection process 100 may further include generate order 150 by the order generator. In generate order 150, an order may be generated for window tint elements corresponding to the window tint criteria determined in select vehicle 110, select windows 120, select film type 130, and/or select opacity 140. The order may be sent, for instance, to an installer or the service department of a dealership. Once the order is sent, the specified window tint may be cut and later installed in the desired vehicle in install window tint 160. In install window tint 160, window tint may be installed having the window tint criteria from the order.

Figure 2:
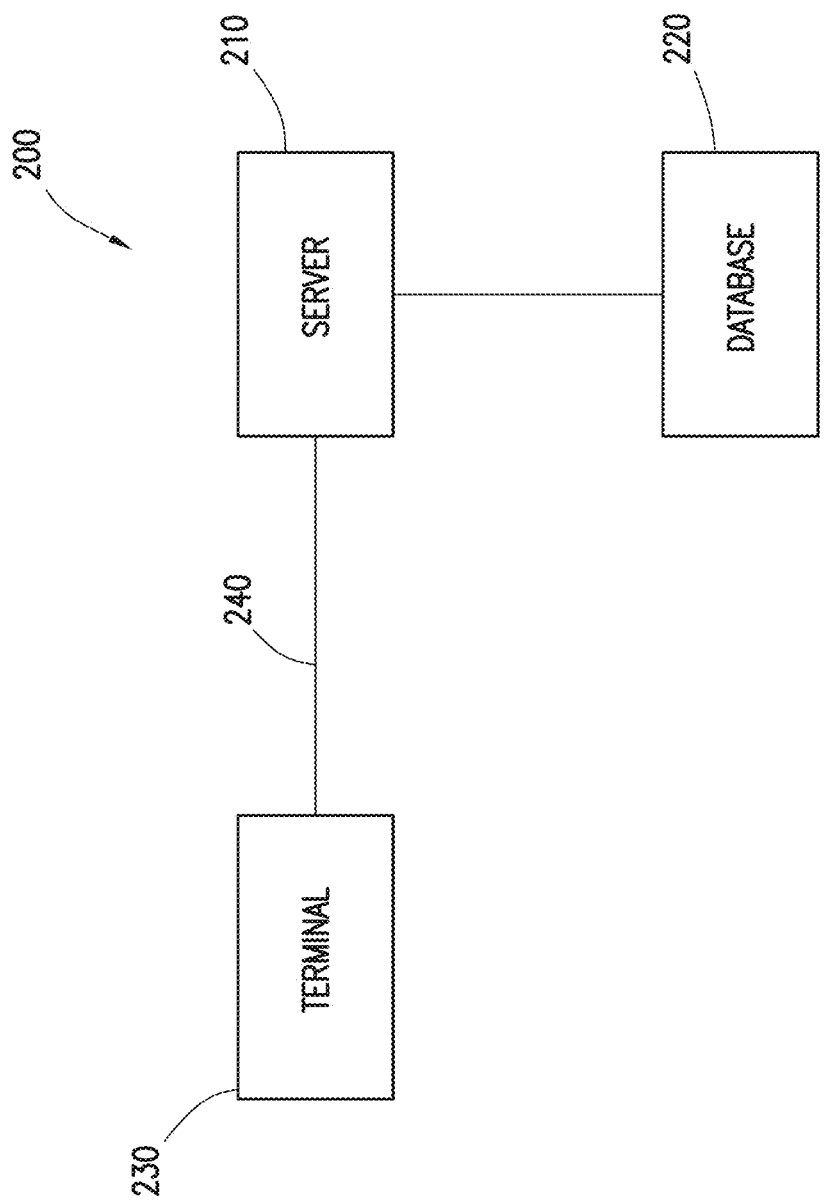
FIG. 2 is a graphical depiction of window tint system consistent at least one embodiment of the present disclosure.

With direction to FIG. 2, window tint system 200 is depicted. In some embodiments of the present disclosure, certain code instructions for constructing the GUIs described herein are located on window tint system 200. Window tint host system 200 may include server 210, database 220 and terminal 230.

In the embodiment depicted in FIG. 2, code instructions for constructing the GUIs and performing certain of the steps shown in FIG. 1 may be located on server 210. Server 210 may source vehicle and tint information and graphics from database 220. In some embodiments, server 210 may include a display device adapted to display the GUIs described above and may include input devices adapted to accept input regarding the information displayed or to be selected on those GUIs.

In some embodiments, server 210 may be in communication with terminal 230. Terminal 230 may include, for instance, a computer terminal, tablet or smartphone screen. Terminal 230 may include a display device adapted to display the GUIs described above and may include input devices adapted to accept input regarding the information displayed or to be selected on those GUIs. Terminal 230 may communicate with server 210 via network 240. Network 240 may include, for example and without limitation, the internet, a personal area network (PAN), a local area network (LAN), a wide area network (WAN) or combinations thereof.

In certain embodiments on the present disclosure, a window tint graphic may be created for use with one of one or more of window selection GUI 300, film type GUI 400, and opacity selection GUI 500. For instance, in some embodiments, graphic of a window having tint may be created using methods known to those of skill in the art. The graphic of the window having tint may be in a .png or .gif format, for example. Graphics of windows having tint may be created for a combination of each or some of: a) the windows of makes and models of vehicles to have tinted windows, b) types of window tinting, and c) opacity levels of a particular type of window tinting. The window having tint graphic may be merged or otherwise imposed on a vehicle graphic to form the window tint graphic. The vehicle graphic may be in a .png or .gif format, for example. In certain embodiments, the graphic of the window having tint may be overlaid onto the vehicle graphic to form the window tint graphic. The window tint graphic may be in a .png or .gif format, for example.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
    generating a GUI adapted to allow a user to:
        (a) select a vehicle having windows to be tinted;
        (b) select the windows to be tinted;
        (c) select the film type for the windows to be tinted, wherein the manufacturer and model for the film type are selected;
        (d) select the opacity of the windows to be tinted;
    receiving from the GUI tint criteria corresponding to the selections in (a)-(d);
    creating a graphic of a window having tint;
    creating a vehicle graphic;
    merging the graphic of the window having tint with the vehicle graphic to form a window tint graphic;
    displaying a real time depiction of the vehicle selected in (a) with the windows to be tinted having the film type selected in (c) and the opacity of the windows selected in (d), wherein the real time depiction is determined by hexcode, color shade, and opacity factor; and
    generating an order for window tint having the selected tint criteria.

2. The method of claim 1, wherein selecting a vehicle includes selecting the vehicle make, model, color and trim.

3. The method of claim 1, wherein the windows to be tinted are rear half, front windows, windshield strip, or combinations thereof.

4. The method of claim 1, further comprising following the step of generating an order:
    installing window tint having tint criteria corresponding to the window tint of the order.

5. The method of claim 1, wherein the real time depiction comprises a photograph or rendering of the vehicle selected in (a) wherein the depiction of the windows thereof may be varied in real time to correspond with the film type selected in step (c) and the opacity of the windows selected in step (d).

6. The method of claim 1, wherein the window tint graphic is in .png or .gif format.

7. The method of claim 1, wherein the graphic of a windows having tint is for a make and model of a vehicle to have tinted windows, a type of window tinting, at a opacity level, or a combination thereof.

8. A system for configuring window tint elements for a vehicle having windows to be tinted comprising:
    a non-transitory, tangible computer-readable memory medium including computer program instructions adapted to cause a computing device to:
        display a GUI, the GUI adapted to allow the selection of tint criteria, the tint criteria including the vehicle make, model, and trim; the windows to be tinted; the film type for the windows to be tinted, wherein the manufacturer and model for the film type are selected; and the opacity of the windows to be tinted,
        create a graphic of a window having tint;
        creating a vehicle graphic;
        merge the graphic of the window having tint with the vehicle graphic to form a window tint graphic;
        display a real time depiction of the vehicle selected in (a) with the windows to be tinted having the film type selected in (c) and the opacity of the windows selected in (d), wherein the real time depiction is determined by hexcode, color shade, and opacity factor; and generate an order for one or more window tint elements corresponding to the selected tint criteria.

9. The system of claim 8, wherein the computing device comprises a computer terminal, tablet, or smartphone.

10. The system of claim 8, wherein the non-transitory, tangible computer-readable memory medium is part of a server and the computing device is a terminal in communication with the server by a network.

11. The system of claim 10, wherein the network comprises a personal area network, local area network, wide area network, or the internet.

12. The system of claim 8, wherein the GUI comprises a window tint visualization window, the window tint visualization window displaying a representation of the vehicle having window tint corresponding to the selected tint criteria.

13. The system of claim 12, wherein the window tint visualization window comprises a photograph or rendering of the vehicle wherein the depiction of the windows thereof may be varied in real time to correspond with a selected tint criterion.

* * * * *